(12) United States Patent
Glasenapp

(10) Patent No.: US 8,767,218 B2
(45) Date of Patent: Jul. 1, 2014

(54) OPTICAL APPARATUS FOR NON-CONTACT MEASUREMENT OR TESTING OF A BODY SURFACE

(75) Inventor: Carsten Glasenapp, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 338 days.

(21) Appl. No.: 13/132,808

(22) PCT Filed: Dec. 2, 2009

(86) PCT No.: PCT/EP2009/066271
§ 371 (c)(1),
(2), (4) Date: Dec. 8, 2011

(87) PCT Pub. No.: WO2010/063775
PCT Pub. Date: Jun. 10, 2010

(65) Prior Publication Data
US 2012/0069351 A1     Mar. 22, 2012

(30) Foreign Application Priority Data

Dec. 5, 2008 (DE) .................. 10 2008 060 621

(51) Int. Cl.
*G01B 11/24* (2006.01)
(52) U.S. Cl.
USPC ..................... 356/602; 356/600; 356/401
(58) Field of Classification Search
USPC .......... 356/600–623, 445–448, 399–401
See application file for complete search history.

(56) References Cited

U.S. PATENT DOCUMENTS

| | | | |
|---|---|---|---|
| 3,102,960 A * | 9/1963 | Sick | 250/204 |
| 3,883,249 A * | 5/1975 | Pryor | 356/505 |
| 4,305,661 A | 12/1981 | Pryor et al. | |
| 4,315,688 A | 2/1982 | Pryor | |
| 4,453,082 A | 6/1984 | Pryor | |
| 4,863,268 A | 9/1989 | Clarke et al. | |
| 5,523,583 A | 6/1996 | Choate | |
| 5,963,328 A | 10/1999 | Yoshida et al. | |
| 6,822,749 B1 | 11/2004 | Christoph | |
| 2008/0225280 A1 | 9/2008 | Jiang et al. | |
| 2013/0155413 A1* | 6/2013 | Liesener et al. | 356/479 |

FOREIGN PATENT DOCUMENTS

| | | |
|---|---|---|
| CH | 312736 | 4/1956 |
| DE | 84941 | 8/1970 |
| DE | 148 982 | 6/1981 |
| DE | 100 47 270 A1 | 2/2002 |
| DE | 10 2006 040 407 A1 | 1/2008 |
| JP | 60-022614 | 2/1985 |
| JP | 3115912 | 2/1993 |
| JP | 2008-233545 | 2/2008 |
| WO | WO 96/25659 | 8/1996 |

\* cited by examiner

*Primary Examiner* — Hoa Pham
(74) *Attorney, Agent, or Firm* — Patterson Thuente Pedersen, P.A.

(57) ABSTRACT

An optical arrangement for the non-contact measurement or testing of properties of a solid's surface, such as curvature, shape, contour, roughness or alignment. An optical arrangement includes structure for establishing a gap between the solid's surface and a reference edge, structure for imaging the gap on a detector, and an analyzing system connected to the detector. The analyzing system is designed to determine gap widths lying adjacent to each other on the basis of the output signals of the detector, and to determine curvature, shape, contour or roughness of the solid's surface on the basis of the gap widths lying adjacent to each other. From the comparison of the images obtained from any two positions within a drilled hole, deductions can be made, among other things, about any tilt between the measuring object and the measuring system.

18 Claims, 5 Drawing Sheets

OPTICAL APPARATUS FOR NON-CONTACT MEASUREMENT OR TESTING OF A BODY SURFACE

PRIORITY CLAIM

The present application is a National Phase entry of PCT Application No. PCT/EP2009/066271, filed Dec. 2, 2009, which claims priority from German Application Number 102008060621.9, filed Dec. 5, 2008, the disclosures of which are hereby incorporated by reference herein in their entirety.

FIELD OF THE INVENTION

The invention relates to an optical arrangement for the non-contacting measurement or testing of properties of a solid surface, such as curvature, shape, contour, roughness or alignment. The arrangement according to the invention is suitable for inspecting the quality of technical surfaces by measurement or comparison with reference surfaces, and for the measurement of microstructures of surfaces.

PRIOR ART

Methods for the measurement of geometries and surface structures for the purpose of manufacturing tolerances of workpieces are known, e.g., in the form of contacting measurement methods.

With these methods, the workpiece is contacted mechanically, the movements of the contacting stylus are detected with the aid of scales, and from the measurement data thus gained one can deduce the workpiece form, or deviations from the design form.

Such methods have achieved a high level of development and boast great variation and flexibility of application. Their disadvantages, however, are that they require the stylus to contact the workpiece, which is undesirable especially in case of soft materials or sensitive, e.g., optical surfaces, and that they involve relatively long measurement times, which interfere with the smooth run of industrial manufacturing processes.

Also known are methods of an optical kind for the non-contacting measurement of surface contours, or for determining the roughness of surfaces or the diameter of drilled holes.

With these methods, light is focused on to the surface to be measured or tested, and the light reflected or scattered by the surface is analyzed. To derive two- or three-dimensional contours from the results, a great number of repeated point measurements in combination with repeated shifts of the measuring arrangement are required. Therefore, these methods also often consume an undesirable amount of time.

A measuring arrangement described in DD 148 982 B1 analyzes the existence of admissible or inadmissible gap widths in the testing of rotationally symmetric components, especially in conjunction with piston rings for internal combustion engines or compression rings for compressors.

The ring to be tested is clamped into a ring gauge, and light is directed on to the gap between the ring under test and the ring gauge. The light passing the gap is converted into an analogue electrical signal by means of a photodetector, and the signal is used for assessing the gap width. It is not possible to test or measure solid geometries and surface topographies with this arrangement.

SUMMARY OF THE INVENTION

Proceeding from the prior art described above, the invention is based on the problem of creating an arrangement of the kind described at the start, with which geometries of solids and topographies of surfaces can be measured or tested within a relatively short time and with little equipment.

According to the invention, an optical arrangement for the non-contacting determination of the property of a solid surface, such as curvature, shape, contour, alignment or roughness, comprises means for establishing a gap between the surface of the solid and a reference edge, wherein
the reference edge defines the direction of a tangent to the solid's surface, and
the distances between the solid's surface and the reference edge, seen in the direction of the normal to the tangent, define gap widths,
means for imaging the gap on to a spatially resolving detector,
an analyzing system linked to the detector, designed
to determine gap widths lying adjacent to each other in the direction of the tangent, on the basis of the output signals of the detector, and
to determine the property of the solid's surface, such as curvature, shape, contour or roughness, on the basis of the gap widths lying adjacent to each other along the tangent.

In alternative configurations, the invented optical arrangement can, depending on the design of the analyzing system, be designed to measure the properties on the basis of the gap widths determined as physical quantities or to test the properties by comparison of the gap widths determined with design gap widths.

In the special case, the extension of the reference edge in the direction of the tangent corresponds to extension of the solid's surface in this direction, i.e., the gap established between the reference edge and the solid's surface extends along the total extension of the solid's surface in this direction. The total gap is imaged on the detector for analysis.

If, however, the extension of the reference edge, seen in the direction of the tangent, is smaller than the extension of the solid's surface, the arrangement according to the invention is provided with means for shifting the reference edge in this direction. What is achieved thereby is that the reference edge, in a time sequence, faces different segments of the solid's surface. The respective gap being established in the direction of the tangent is imaged on the detector for analysis.

In this way, the one-dimensional contour of the solid's surface in the direction of the reference edge can be determined. If, in addition, the structure is to be determined in several dimensions in the form of a topography of the solid's surface, a suitable configuration of the arrangement according to the invention is, in addition, provided with means for parallel shifting of the reference edge normal to the tangent direction. What is achieved thereby is that the reference edge, in a time sequence, faces different segments of the solid's surface, and the respective gap being established is imaged on the detector for analysis.

In conjunction with the shifting of the reference edge, a guide track may be provided, which can be designed, e.g., as a straight or curved mechanical guideway and serves to guide the moving reference edge at a constant distance from the solid's surface, which distance corresponds to a specified gap width.

Within the scope of the invention it is feasible that, either as an alternative to a guide track or in addition to it, a control device for maintaining the distance between the reference edge and the solid's surface is provided, which is designed on the basis of continuous or periodic distance measurement.

The detector consists of a great number of individual sensors, which are arranged either in one row or in several parallel rows.

The electronic output signals of those sensors of the detector on which the gap is imaged or which are illuminated due to the imaging, are a measure of the gap width. The gap width and the location of the gap are determined by an analysis of the intensity distribution as an equivalent of the output signal strengths. For analyzing the intensity distribution, subpixel algorithms are used to advantage. As such analyses are known in prior art, they will not be explained in detail here. By means of subpixel analysis, the intensity distribution can be determined to greater accuracy than by the alternatively possible intensity distribution analysis that takes the distances of individual sensors into account.

The detectors to be used may be, e.g., CCD sensors, which consist of light-sensitive photodiodes, also called pixels, as a rule arranged in rows and columns or, less frequently, in a single row.

In an example embodiment of the invented optical arrangement, the reference edge is allocated a light exit aperture, from which the light coming from a light source, preferably through some optical focusing system, is directed on to the solid's surface facing the reference edge. In this, the light exit aperture is positioned relatively to the detector in such a way that the exiting light serves provides the illumination for imaging the gap on the detector.

As a light source, a light-emitting diode can be used, which preferably emits light of a specified wavelength and homogeneous intensity and which is connected with the light exit aperture, e.g., via a light conductor.

Alternatively, a broad-band light source in combination with a diffractive lens can be used in order to vary the location of the focal line depending on the wavelength. On this basis, measurements in axial direction are possible.

It is of particular advantage if the reference edge is provided on a gauge and if the light source is integrated in the gauge.

In front of the detector there should be arranged an optical imaging system with a defined lateral magnification. Based on this lateral magnification on the one hand and the spacing of the pixels on the receiving area of the detector on the other, the width of the gap is determined by means of an image interpretation program.

The detector and the optical imaging system can be components of a camera, and the camera and the gauge are firmly joined to each other at a specified distance.

To enable optical scanning of surfaces difficult to access, at least one deflecting mirror may be provided in the ray path between the gap and the optical imaging system.

To suppress undesirable reflections during the optical scanning of the surface, a polarizing filter can be arranged in front of the optical imaging system. In that way, especially reflections that have a polarizing direction parallel to the solid's surface and could corrupt the result of the analysis will not be imaged on the detector.

For determining the curvature, shape, contour or roughness of essentially plane surfaces of solids or selected areas of such surfaces, the reference edge is designed as a straight line.

The scope of the invention also comprises an embodiment in which
the reference edge is designed in a ring shape, and the solid's surface is the internal surface of a circular cylinder that encloses, and is concentric with, the reference edge, so that
an annular gap is formed between the reference edge and the solid's surface, and in which
means for imaging the annular gap on to a spatially resolving detector are provided.

Here again, the reference edge is provided on a gauge, which in this case has the form of a round plug gauge. The light exit surface is also of annular shape and correlated to the reference edge.

Here again, it is of advantage to provide means for shifting the plug gauge together with the reference edge and the light exit surface in the direction of the central axis of the cylindrical inner surface.

In this embodiment, the invented optical arrangement is especially suitable for non-contact measurement or testing of the diameter, position, alignment or form of drilled holes. In particular, by shifting the plug gauge in the direction of the cylindrical inner surface, a three-dimensional surface topography of the hole can be established.

Here again, the detector is a CCD camera with an optical system, which is joined to the plug gauge at a fixed distance. Given the magnification of the optical system and the pixel spacing, one can deduce the diameter, form and alignment of the hole from the camera image.

The inventive idea also includes configurations in which the reference edge is exchangeable or adjustable in size, and configurations in which the shape, contour, alignment or roughness of the solid's surface is determined from the interpretation of the camera image generated by light diffraction.

BRIEF DESCRIPTION OF THE DRAWINGS

Below, the invention will be explained by embodiment examples. In the accompanying drawings.

DETAILED DESCRIPTION

Figure 1:
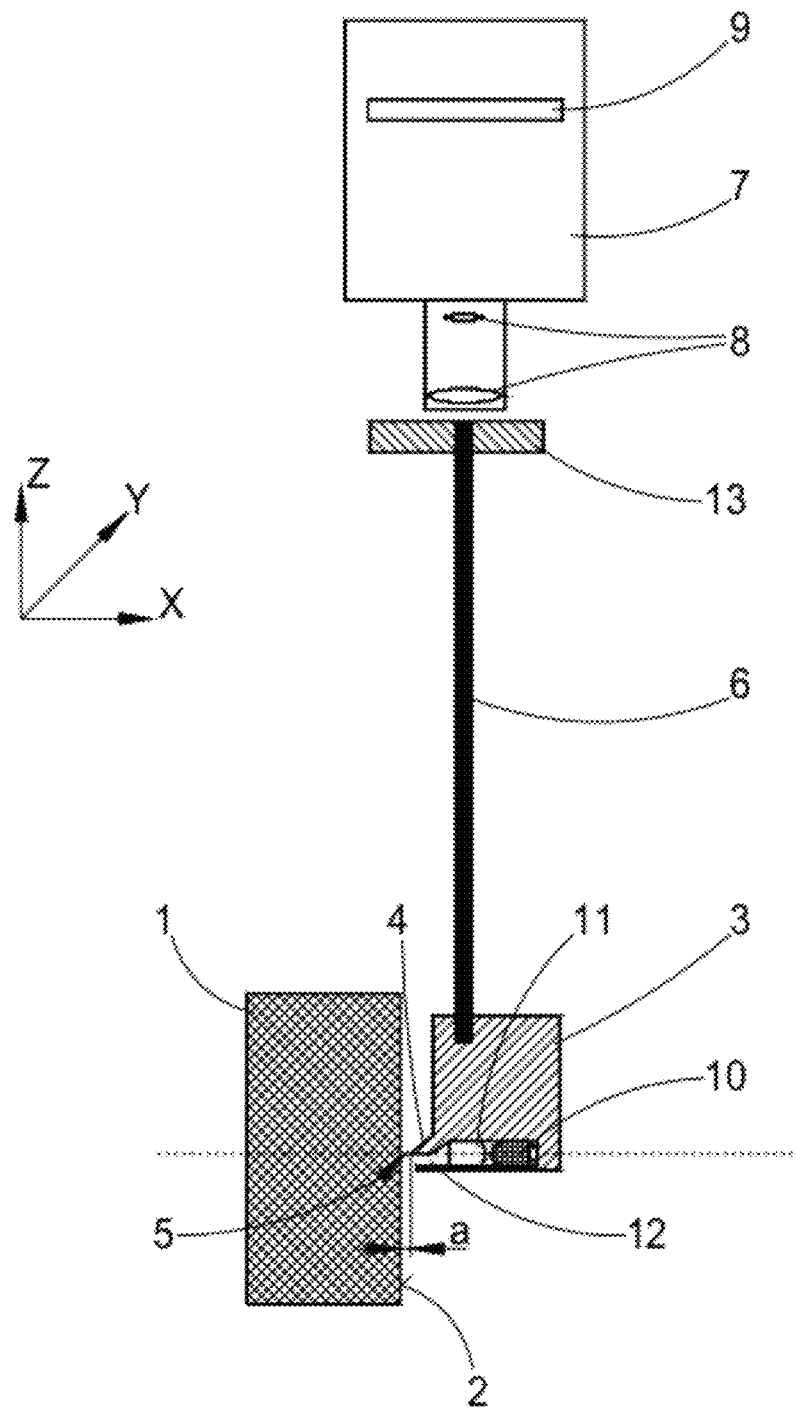
FIG. 1 illustrates the principle of the optical arrangement according to the invention.

FIG. 1 shows symbolically a solid 1 with a surface 2, of which the curvature, shape, contour or roughness are to be measured or tested. The surface 2 faces a gauge 3 with a reference edge 4. Between the reference edge 4 and the surface 2, there is a gap 5 of gap width a.

Via a spacing means 6, the gauge 3 is joined to a camera 7, which comprises an optical imaging system 8 and a spatially resolving detector 9.

For explaining the mode of operation of the arrangement according to the invention, let us assume that the surface 2, which in this embodiment example is essentially plane, extends in the coordinate directions Y,Z of a Cartesian coordinate system X,Y,Z, whereas the gap width a extends in the direction X. The reference edge 4, then, extends in the direction Y, or normal to the drawing plane X,Z, and the gap 5 lies in the plane X,Y.

Integrated in the gauge 3 is a light-emitting diode 10, with a focusing optical system 11 arranged in front of it, in the radiation direction of the light emitted by the diode. Preferably, the light-emitting diode 10 emits light of a specified wavelength, e.g., 500 nm, and homogeneous intensity.

Allocated to the reference edge 4 is a light exit aperture 12, through which the light of the light-emitting diode 10 illuminates the measuring object at the height of the gap 5. By means of the optical imaging system 8, the illuminated gap 5 is imaged on to the spatially resolving detector 9 through a transparent holding plate 13; the images of the reference edge 4 and the segment of the surface 2 facing the reference edge 4 constitute the measuring marks for the gap width.

The detector 9 is provided with a great number of individual sensors, also referred to as pixels, which are arranged either in a single row or in a matrix of several rows and columns. The lateral magnification of the optical imaging system 8 is matched to the spacing of the pixels in the detector in such a way that the electronic output signals of the pixels that are illuminated when the gap 5 is imaged on the detector 9 are an equivalent of the gap width a.

If the transparent holding plate 13 is designed as a polarizing filter, interfering reflections that have a polarizing direction parallel to the solid's surface 2 will not be imaged on the detector, which is an advantage.

The extension of the gap 5 in the direction Y is matched to the number of parallel, adjacent sensor rows of the detector 9. If the detector 9 has a single row of sensors only, the reference edge 4 has an extension corresponding to the detecting area of the sensors of this row in the Y direction. If the detector 9 has several sensor rows adjacent in Y direction, the reference edge 4 is extended to match the receiving area of these sensors.

Arranged behind the detector 9 is an analyzing system, not shown on the drawing, which is designed to determine a great number of gap widths a lying adjacent to each other in Y direction, on the basis of the output signals emitted by the detector, and to determine the property of the solid's surface on the basis of the differences of the gap widths a lying adjacent to each other in Y direction.

By means of the analyzing system and on the basis of the gap widths a, the curvature, shape, contour, alignment or roughness of the surface 2 are determined in the zone facing the reference edge 4. To scan larger areas of the surface 2 for the purpose of determining the gap widths a, means for shifting the arrangement according to the invention and the solid 1 relative to each other in Y and/or Z direction are provided.

For example, the solid 1 may be arranged in a fixed position, whereas the arrangement according to the invention is movably connected to the shifting means. Shifting in Y and/or Z direction permits the gap width a to be determined for areas of the surface 2 that have an extension greater than the extension of the reference edge 4. On this basis, the above-mentioned properties such as curvature, shape, contour or roughness are determined over wide areas of the surface 2.

The shifting means, not shown on the drawing, can be implemented by straight-line guideways which are known in prior art. A constrained mechanical guideway may be provided that keeps the distance between the surface 2 and the reference edge 4 constant during shifting.

As an alternative to a constrained mechanical guideway, a control device may be provided, which is designed to maintain the distance between the between the surface 2 and the reference edge 4 on the basis of continuous or periodic distance measurement. Correction of the gap width a, when required, is effected by adjustment in X direction.

Figure 2:
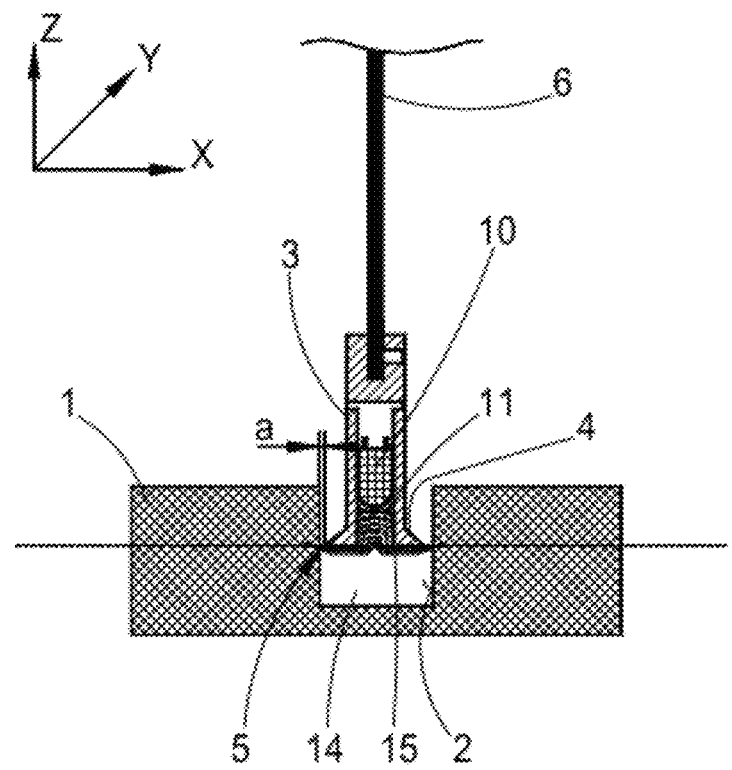
FIG. 2 shows the optical arrangement according to FIG. 1 in an embodiment for the non-contacting measurement or testing of the inner surfaces of recesses, especially of drilled holes.

Whereas the embodiment example according to FIG. 1 describes the mode of operation of the invented arrangement in conjunction with the determination of the properties of a surface 2 that lies on the outside of a solid 1 and is essentially plane, FIG. 2, illustrating a second embodiment example, shows the mode of operation in case of the non-contacting measurement or testing of the properties of an inside surface 2 of the solid. For greater clarity, components in FIG. 2 that correspond to those in FIG. 1 are identified by the same reference numbers.

The solid 1, here shown in a cross-section, has a recess 14, e.g., a drilled hole or longitudinal slot. Other than in the embodiment example according to FIG. 1, the gauge 3 is designed as a plug gauge that is plunging into the recess 14.

In this case again, the Y direction corresponds to the direction of a line tangent to the surface 2; the X direction corresponds to the direction of the normal to the tangent. Again, the gap widths a are measured in the X direction.

Here again, a light-emitting diode 10 is integrated in the gauge 3; in the light path from the light-emitting diode 10 to the gap 5, a focusing optical system 11 is provided. Here again, a light conductor may be provided.

To permit areas of the surface 2 to be scanned whose extension exceeds the extension of the reference edge 4, means for shifting the invented arrangement and the solid 1 relative to each other in the direction of the tangent and/or in the Z direction may be provided here, too, preferably again in conjunction with a constrained guideway.

Figure 3:
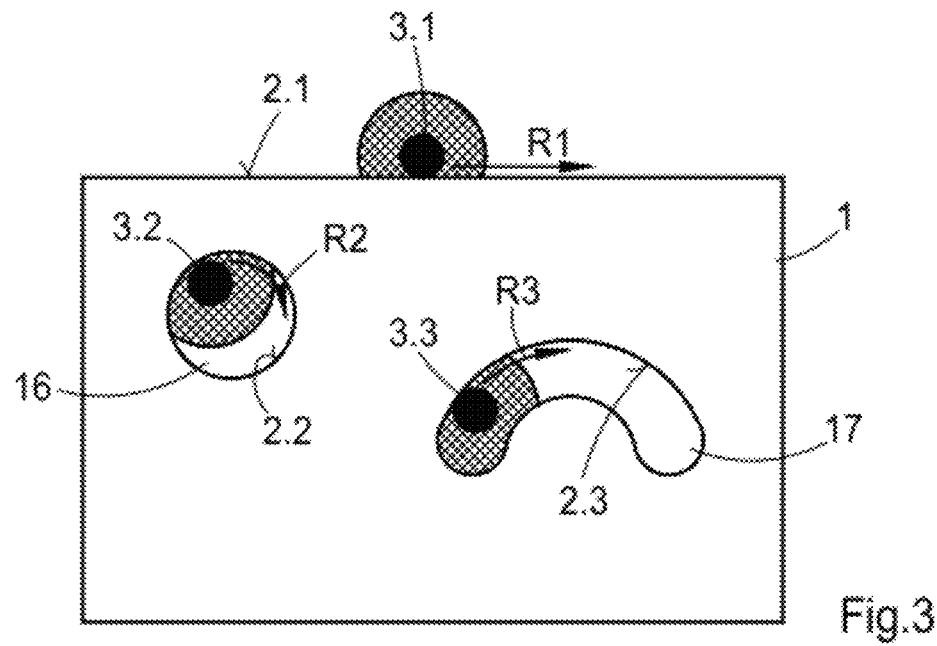
FIG. 3 shows examples of the non-contacting measurement or testing of outer or inner surfaces of technical solids.

FIG. 3 shows different embodiment examples of how to position and guide the gauge 3 or the invented arrangement relative to different areas of the surface 2 of solid 1.

For example, the gauge 3.1 is provided for the non-contact scanning of an outside plane surface 2.1 of the solid; for this purpose the gauge can be shifted in the direction R1.

The gauge 3.2, designed as a plug gauge as shown in FIG. 2, is intended for scanning an inside, curved surface 2.2, e.g., a hole 16 drilled into the solid 1. For this purpose, the gauge 3.2 is moved along a circular path in the direction R2, with the distance between the reference edge 4 and the surface 2.2 being kept constant by means of a constrained guideway or closed-loop distance control.

The gauge 3.3 is intended for scanning the inside, curved surface 2.3 of a longitudinal slot 17 machined into the solid 1. The gauge 3.3, designed as a plug gauge again, is moved in the direction R3, with the distance between the reference edge 4 and the surface 3.3 again being kept constant.

The directions of movement R1, R2 and R3 always correspond to the direction of the tangents to the respective surface 2.1, 2.2, 2.3, whereas the gap width a is measured in the direction of the normal.

In FIG. 3, scanning the surfaces 2.1, 2.2 and 2.3 is effected in the drawing plane, i.e., the curvature, shape, contour or roughness of the surfaces 2.1, 2.2 and 2.3 are, in the presentation selected for explanation, determined only in the drawing plane. For additional determination outside the drawing plane, or for ascertaining the surface topographies, the gauges 3.1, 3.2 or 3.3 are shifted into or out of the drawing plane. By lining up several contour lines, one can establish a three-dimensional topography of the surfaces 2.1, 2.2 and 2.3 to be measured or tested.

Similarly, non-contacting measurement or testing of surfaces 2 of external or internal tapers is possible in this way.

Generally, the form of the gauge should be matched to the test specimen contours to be measured. Round forms are eligible for drilled holes; it is expedient to use gauges of different diameters to suit different hole diameters, because the measuring error increases with the size of the light gap. Accordingly, the inventive idea includes

- a set of gauges of different diameters, or
- a gauge with an interchangeable aperture, in which an aperture disc is exchanged to adapt the outside diameter to the diameter of the drilled hole to be measured, or
- a variable gauge in which the outer diameter can be varied continuously according to the principle of an inverted iris diaphragm.

Depending on its configuration, the arrangement according to the invention permits measurement or testing both by the light gap method as well as by the principle of triangulation measurement.

In the light gap method, the reference edge practically has the function of the measuring knife edge of a familiar straight-edge. The gauge is positioned in such a way that the reference edge faces the surface to be measured or tested or, alternatively, is placed on top of it; the gap formed thereby is illuminated by backlight and imaged as a light gap on the spatially resolving detector as described, the image being analyzed quantitatively or qualitatively by means of image analysis methods.

In other words: With increasing light gap, the sensor continuously changes its measuring method. The light gap sensor is converted into a triangulation sensor. The triangulation sensor determines its distance from the centre point or from the reference edge of the gauge from the location of the light intensity distribution of the surface on the camera chip.

In the triangulation method, the gap and the two rays coming from the reference edge and from the zone of the surface facing the reference edge, respectively, form a triangle. On the basis of the known triangulation relations, knowledge of the distance between the reference edge and the detector at the gauge and of the positions of the images of the reference edge illuminated by backlight and of the zone of the surface facing the reference edge is used to analyze the gap width.

Thanks to the use of a focusing illuminator, it is possible that small gap widths can be determined by the principle of the light gap method, and greater light gaps by the principle of the triangulation method, without any undesirable mutual interference between the two methods. The illuminating light should be focused on the respective zone of the surface so as to achieve the desired measuring accuracy. The accuracy of depth measurement is defined by the size of the focal line.

The measuring range can be expressed as a function of the accuracy depending on the gap width a. For gap widths a<100 μm, the measuring accuracy may be influenced by the shadow cast by the plug gauge. For gap widths a >100 μm, the accuracy achievable is defined by the beam waist of the illumination. For the respective application, the location and extension of the focal line of the illuminating optics needs to be adapted to the required measuring accuracy or the required measuring range. Short focal lengths yield high measuring accuracy with a smaller measuring range, whereas longer focal lengths yield a greater measuring range but lower accuracy.

Optionally, diffractive illuminating optics with a spectrally tunable light source may be provided, which allows the measuring range to be expanded without detriment to the measuring accuracy that can be achieved. This is due to the linear dependence between wavelength and focal length in case of diffractive lenses. Thus, the location of the focal line can be determined by selection of the wavelength. The tunable light source can be implemented in the form of several light sources of different wavelengths, or a multispectral laser, or a white light source in conjunction with a spectral filter.

Several light sources of different wavelengths or a spectrally tunable light source are useful also because different materials and surfaces differ in their reflection properties regarding the light of a wavelength.

Furthermore, influences of extraneous light can be blocked by means of a color filter in front of the optical imaging system.

A substantial advantage of the arrangement according to the invention is its suitability for non-contact checks of design geometries or topographic measurements of geometries in a matter of seconds.

As another field of application, the arrangement can be used in coordinate measuring machines. As the gap width a can be determined accurately, fast non-contact determination of the position, alignment and surface structure of any workpiece in the coordinate system of a coordinate measuring machine is possible.

In this application, the arrangement according to the invention may include means for measuring and controlling the distance between the gauge and the workpiece in axial direction to prevent the risk of collisions. The distance control in the direction of the gap width a, mentioned before, can be used here, too, to detect a collision risk early. The use of an axial distance sensor extends the scope of application of the arrangement described in that measurements can be made throughout the +/−x, +/−y and +z half-space of the X, Y, Z coordinate system.

If, in any embodiment of the invented arrangement already described above,

- the reference edge is of annular shape and formed on a circular plug gauge and if the solid's surface is the inside surface of a circular cylinder surrounding, and concentric with, the reference edge, so that
- an annular gap is formed between the reference edge and the solid's surface, and if
- means for imaging the annular gap on to a spatially resolving detector are provided, a vertical light distribution within a drilled hole to be analyzed is imaged on to the horizontal plane of the detector. To allow deducing the diameter or form of the hole from the intensity distribution recorded by the detector, the light distribution in the hole and its spread must be defined.

Figure 4:
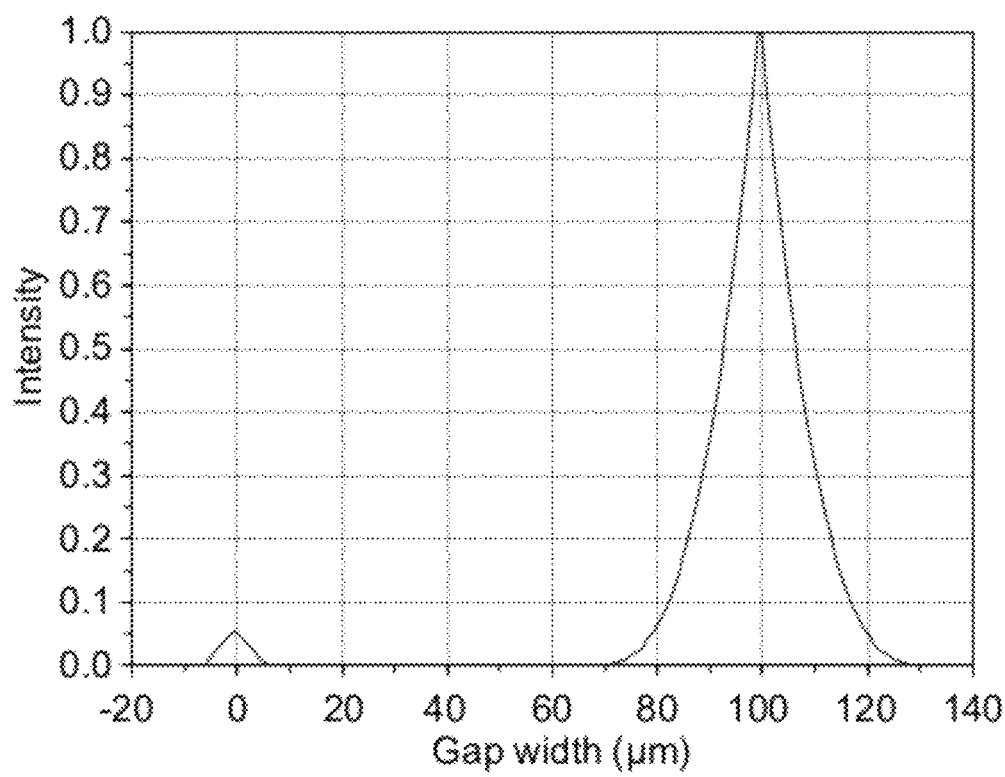
FIG. 4 shows a first example of an image of the gap on the detector.

If, with the inside wall of a drilled hole being illuminated, the intensity centroid of the light distribution lies in the object plane of the optical imaging system, the intensity centroid in the image on the detector corresponds to the position of the wall of the hole. FIG. 4 shows an example of this.

This case applies, above all, to gap widths a>1 mm and a hole diameter of 10 mm.

Figure 5:
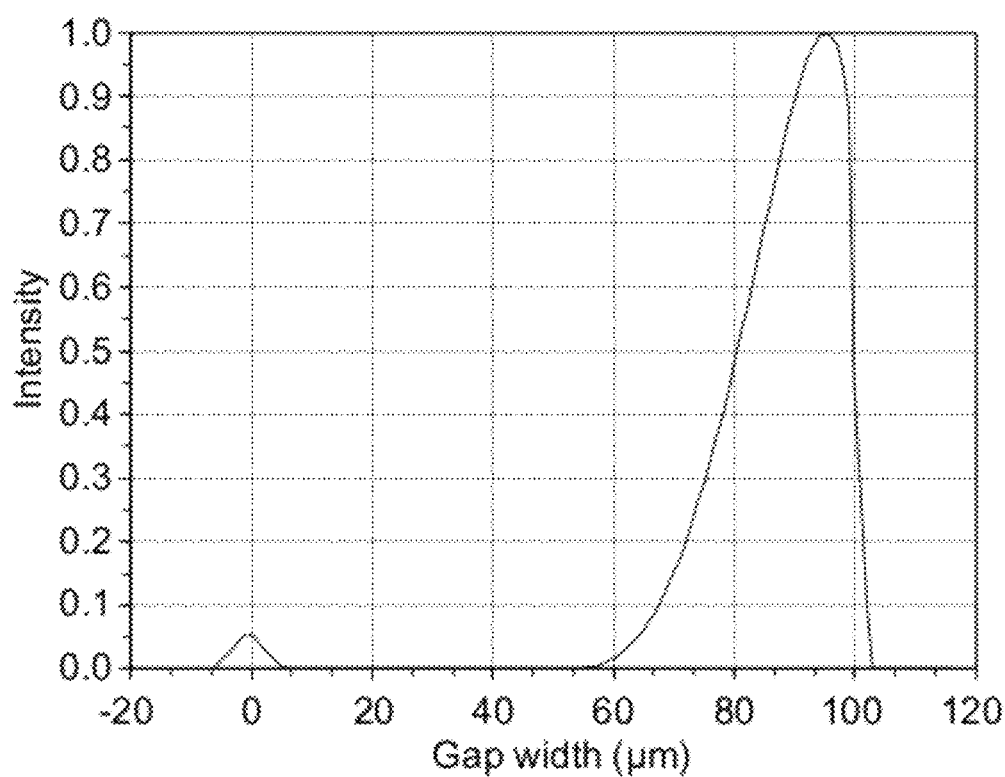
FIG. 5 shows a second example of an image of the gap on the detector.

For small gap widths a<1 mm at the same hole diameter, the intensity centroid of the light distribution in the hole lies below the object plane of the optical imaging system. In this case, the position of the wall of the hole is on the trailing edge of the intensity distribution in the image. FIG. 5 shows an example of this.

In the embodiment example described below with reference to FIG. 6, the invented arrangement is used for the non-contacting measurement or testing of surface roughness, diameter, position or form accuracy of a drilled hole 18 having a highly reflective inside surface 19.

Figure 6:
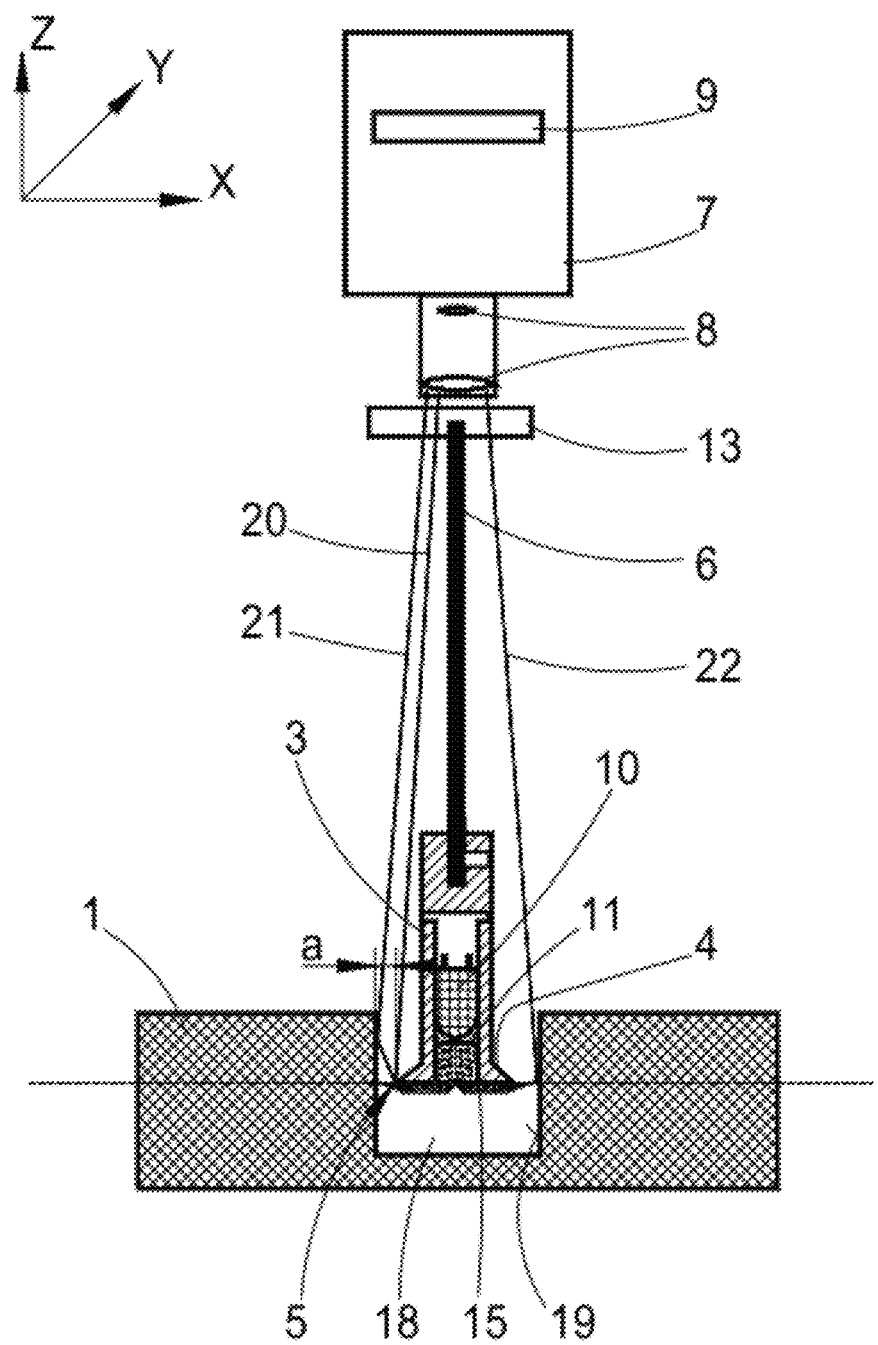
FIG. 6 shows the optical arrangement according to FIG. 2 in an embodiment especially suitable for the non-contacting measurement or testing of the diameter, position, orientation or alignment, form accuracy or roughness of a drilled hole with a particularly highly reflecting inner surface.

As far as this adds to clarity, those components shown in FIG. 6 that are also shown in FIG. 1 or FIG. 2 have the same reference numbers. This applies to the solid 1, here with the drilled hole 18, the gauge 3 with a reference edge 4 with circular curvature, a gap 5 of gap width a, in this case formed between the reference edge 4 and the inside surface 19 of the hole 18, and a spacing means 6 which joins the gauge 3 to a camera 7. Here, same as described before, the gauge 3 is designed as a plug gauge plunging into the hole 18.

Again, the camera 7 comprises an optical imaging system 8 and a spatially resolving detector 9. Also provided are a light-emitting diode 10, a focusing optical system 11, a light exit aperture 12, a holding plate 13 and a light conductor 15. The light-emitting diode 10 is integrated in the gauge 3, the focusing optical system 11 is arranged in the light path between the light-emitting diode 10 and the gap 5, and the reference edge 4 is arranged in a fixed position in the focal plane F of the focusing optical system 11. The light conductor 15 serves the purpose of transmitting the measuring light emitted by the light-emitting diode and its radiation in the direction of the inside surface 19.

The Y direction in this case corresponds to the direction of a tangent to the inside surface 19 of the hole 18, whereas the X direction defines the direction of the normal to the tangent. The respective gap width a is measured in the X direction. To permit the inside surface 19 to be scanned throughout the depth of the hole, means for shifting the invented arrangement including the gauge 3 relative to the solid 1 in the Z direction (not shown on the drawing).

Unlike the embodiments according to FIG. 1 and FIG. 2, the inside surface 19 has strongly reflective properties here.

For measurement, the gauge 3 and, with it, the reference edge 4 are inserted into the hole 18, with the homogeneous light emitted by the light-emitting diode 10 and transmitted by the light conductor 15 illuminating the inside surface 19. The reflective property of the inside surface 19 causes light reflected by the inside surface 19 hits the reference edge 4 and is scattered by it. The light scattered by the reference edge 4 is imaged on the detector 9 of the camera 7 by means of the optical imaging system 8, which is permanently arranged at a defined distance from the gauge 3.

Figure 7:
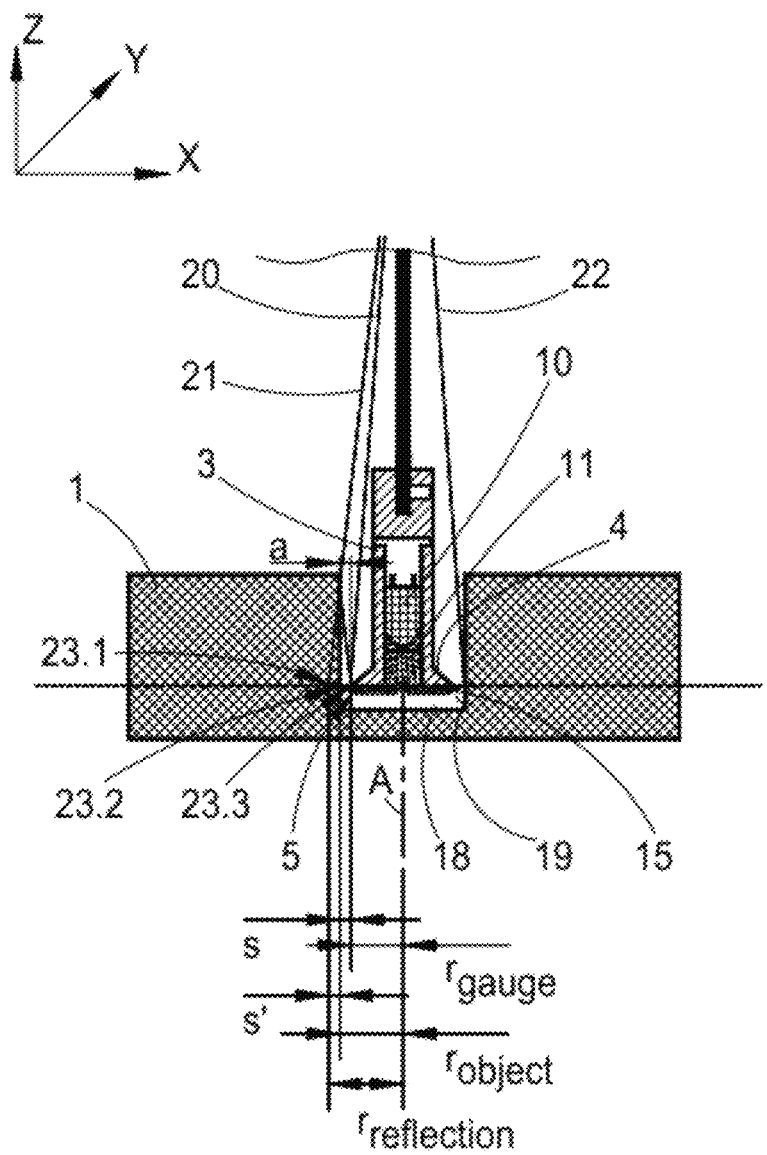
FIG. 7 shows the ray paths involved in the measurement or testing of a drilled hole with the embodiment shown in FIG. 6.

Thereby, two ring-shaped images of the reference edge 4 are produced on the detector 9: a first ring-shaped image is produced via ray path 20, which, starting from Position 23.3 shown in FIG. 7, describes the direct path of the light from the circumference of the reference edge 4 to the detector 9; a second ring-shaped image is produced via ray path 21, which, depending on Position 23.1 shown in FIG. 7, describes the path of the light scattered by the reference edge 4 and reflected at the reflecting inside surface 19 to the detector 9.

From the combination of the positions of the two images on the detector 9 with the lateral magnification of the optical imaging system 8, the diameter of the hole 18 is determined by means of an analyzing system connected downstream.

FIG. 7 is intended to explain the determination of the positions of the two images on the detector 9. With reference to the centre of the circular reference edge 4, one can determine the radius $r_{gauge}$ of an the reference edge 4 and the radius $r_{reflection}$ of the reflection at the inside surface 19. It follows from the laws of reflection that the distance S shown in FIG. 7 is equal to the distance S'. Therefore, the radius $r_{object}$ of the hole 18 can be determined from the relation $r_{object}=(r_{reflection}+r_{gauge})/2$. The diameter d of the hole 18 then results from $d_{object}=r_{reflection}+r_{gauge}$.

In addition to the two images mentioned above of the reference edge 4, another ring-shaped image is produced on the detector 9 due to the ray path 22, which describes the path of the light from position 23.2, which on the inside surface 19 is illuminated by the light emerging from the light conductor 15, to the detector 9. From the comparison of the locations of the images obtained via ray paths 21 and 22, an analyzing device connected downstream makes deductions about the alignment of the inside surface 19 on the one hand, and about a tilting angle between the centre axis A of the hole and the focal plane F. On the basis of this information it is possible to influence the alignment of the measuring object, i.e. the hole 18, relative to the gauge 3, i.e. to the invented optical arrangement, and to correct undesirable deviations.

The image produced due to ray path 22 appears on the detector 9 between the two images of the reference edge 4 and depends, as regards its intensity, on the reflectivity or roughness of the inside surface 19. If we suppose that the inside surface 19 reflects 100% of the light or that the roughness of the inside surface 19 is equal to zero, this image is invisible, because the light is completely reflected by the entire inside surface 19. However, the share of the light scattered off the inside surface 19 increases with its roughness and depending on the wavelength of the light; as a consequence, the image of this illuminated zone becomes visible with increasing distinctness.

The positions 23.1, 23.2 and 23.3 shown in FIG. 7 are only positions in the drawing plane of the cross-section shown of the gauge 3 and the hole 18. Since reference edge 4 extends as a circle and, thus, the positions 23.1, 23.2 and 23.3 also extend on a circle within the hole 18, the respective images are also circular.

From the use of the optical arrangement according to the invention, there result the following advantages:

1. It is possible to measure objects with roughnesses smaller in extension than the wavelength of the illuminating light.

2. A statement on the roughness of the object can be made by a comparison of the intensities of the images obtained from positions 23.1, 23.2 and 23.3.

3. From the integration and the comparison of the images obtained from any two positions within the hole 18 by means of the ray paths 21 and 22, deductions can be made, firstly, about the alignment of the inside surface 19 and, secondly, about a tilting angle between the centre axis A of the hole and the focal plane F and, thus, about a tilt of the measuring object relative to the gauge 3, i.e., to the invented optical arrangement.

As far as this is concerned, the embodiment example of the invented optical arrangement as shown in FIG. 6 and FIG. 7 is of particular advantage for the non-contacting measurement or testing of the diameter, position, the orientation or alignment, and the form accuracy of drilled holes with surfaces of low roughness.

LIST OF REFERENCES 1 solid
2, 2.1, 2.2, 2.3 surface of the solid
3, 3.1, 3.2, 3.3 gauge
4 reference edge
5 gap
6 spacing means
7 camera
8 optical imaging system
9 detector
10 light-emitting diode
11 focusing optical system
12 light exit aperture
13 holding plate
14 recess
15 light conductor
16 drilled hole
17 longitudinal slot
18 drilled hole 19 inside surfaces
20, 21, 22 ray paths
23.1, 23.2, 23.3 positions
a gap width
A centre axis of drilled hole
F focal plane
X, Y, Z directions
R1, R2, R3 motion directions

What is claimed is:

1. An optical arrangement for non-contact determination of a property of a solid's surface, comprising:
    structure that establishes a gap between the solid's surface and a reference edge, wherein the reference edge is part of a gauge and defines a direction of a tangent line to the solid's surface, and the distances between the solid's surface and the reference edge, seen in the direction of a normal to the tangent line, define gap widths,
    structure that images the gap onto a spatially resolving detector,
    a light source integrated in the gauge, wherein radiation of the light source is directed at a zone of the solid's surface facing the reference edge through a focusing optical system,
    an analyzing system connected to the detector, configured to determine gap widths lying adjacent to each other in the direction of the tangent, on the basis of the output signals of the detector, and
    to determine the property of the solid's surface, on the basis of the gap widths lying adjacent to each other along the tangent.

2. An optical arrangement as claimed in claim 1, structured to measure the property on the basis of the gap widths determined as physical quantities, or to test the property by comparison of the determined gap widths with design gap widths, each by a light gap method or a triangulation method.

3. An optical arrangement as claimed in claim 1, in which an extension of the reference edge is smaller than an extension of the solid's surface in a direction of the reference edge; and
    further comprising means for longitudinal shifting of the reference edge in the direction of the tangent.

4. An optical arrangement as claimed in claim 3, further comprising means for constrained guiding during the shifting of the reference edge, such that the reference edge is kept at a specified distance to the solid's surface which corresponds to the gap width.

5. An optical arrangement as claimed in claim 3, further comprising a controller that maintains the distance between the reference edge and the solid's surface on the basis of continuous or periodic distance measurement.

6. An optical arrangement as claimed in claim 1, further comprising means for parallel shifting of the reference edge and, thus, for the parallel shifting of the gap normal to the tangent.

7. An optical arrangement as claimed in claim 6, further comprising means for constrained guiding during the shifting of the reference edge, such that the reference edge is kept at a specified distance to the solid's surface which corresponds to the gap width.

8. An optical arrangement as claimed in claim 1, wherein the detector comprises at least one row of many individual sensors, and wherein subpixel algorithms are used to determine a location and spread of an intensity distribution on the individual sensors.

9. An optical arrangement as claimed in claim 1, in which the light source comprises a light-emitting diode.

10. An optical arrangement as claimed in claim 9, wherein the light emitting diode emits light of a specified wavelength and homogeneous intensity.

11. An optical arrangement as claimed in claim 1, further comprising a straight or curved mechanical guideway that guides shifting of the reference edge.

12. An optical arrangement as claimed in claim 1, wherein the light source comprises a broad-band light source in combination with a diffractive lens which produces a location of a focal line that differs depending on the wavelength.

13. An optical arrangement as claimed in claim 1, in which
    an optical imaging system with defined lateral magnification is arranged in front of the detector,
    the detector and the optical imaging system are components of a camera, and
    the camera and the gauge are joined at a specified distance from each other to form a subassembly.

14. An optical arrangement as claimed in claim 13, further comprising means for measurement and control of the distance between the gauge and the solid that features the surface.

15. An optical arrangement as claimed in claim 13, further comprising a polarizing filter arranged in front of the optical imaging system.

16. An optical arrangement as claimed in claim 13, further comprising means for distance measurement with which measurements in axial direction in the +/−x, +/−y, +z half-space of the X,Y,Z coordinate system are made.

17. An optical arrangement as claimed in claim 1, in which the reference edge is exchangeable or the size of the reference edge is adjustable.

18. An optical arrangement as claimed in claim 1, further comprising a controller configured to determine from a camera image shape, contour, alignment or roughness of the solid's surface due to light diffraction.

* * * * *

UNITED STATES PATENT AND TRADEMARK OFFICE
CERTIFICATE OF CORRECTION

| | |
|---|---|
| PATENT NO. | : 8,767,218 B2 |
| APPLICATION NO. | : 13/132808 |
| DATED | : July 1, 2014 |
| INVENTOR(S) | : Carsten Glasenapp |

It is certified that error appears in the above-identified patent and that said Letters Patent is hereby corrected as shown below:

Title Page, item (56),

Under "FOREIGN PATENT DOCUMENTS", delete "DE 84941" and insert --DD 84941--

Under "FOREIGN PATENT DOCUMENTS", delete "DE 148 982" and insert --DD 148982--

Signed and Sealed this
Fifteenth Day of December, 2015

Michelle K. Lee
*Director of the United States Patent and Trademark Office*